United States Patent [19]
Reiter

[11] Patent Number: 5,992,018
[45] Date of Patent: Nov. 30, 1999

[54] VALVE NEEDLE AND PROCESS FOR PRODUCING A VALVE NEEDLE

[75] Inventor: Ferdinand Reiter, Markgroeningen, Germany

[73] Assignee: Robert Bosch GmbH, Stuttgart, Germany

[21] Appl. No.: 09/029,964
[22] PCT Filed: Feb. 28, 1997
[86] PCT No.: PCT/DE97/00364
  § 371 Date: Mar. 11, 1998
  § 102(e) Date: Mar. 11, 1998
[87] PCT Pub. No.: WO98/02657
  PCT Pub. Date: Jan. 22, 1998

[30] Foreign Application Priority Data

Jul. 11, 1996 [DE] Germany .......................... 196 27 939

[51] Int. Cl.⁶ ...................................................... B05B 1/30
[52] U.S. Cl. ..................................... 29/888.45; 239/585.4; 239/900
[58] Field of Search ........................ 251/129.21, 129.19; 239/585.1–585.5, 900; 29/888.45, 888.4

[56] References Cited

U.S. PATENT DOCUMENTS

| | | | |
|---|---|---|---|
| 4,905,907 | 3/1990 | Ricco | 239/585.3 X |
| 5,178,362 | 1/1993 | Vogt et al. | 239/585.1 X |
| 5,299,776 | 4/1994 | Brinn | 239/585.1 X |
| 5,518,185 | 5/1996 | Takeda et al. | 239/585.1 X |
| 5,732,888 | 3/1998 | Maier et al. | 239/585.1 |
| 5,775,600 | 7/1998 | Wildeson et al. | 239/585.1 X |
| 5,820,031 | 10/1998 | Reiter et al. | 239/585.1 |

FOREIGN PATENT DOCUMENTS 4 420 176  12/1995  Germany .

*Primary Examiner*—Kevin Weldon
*Attorney, Agent, or Firm*—Edwin E. Greigg; Ronald E. Greigg

[57] ABSTRACT

An electromagnetically actuatable valve, including a connecting piece, which is connected to an armature. The valve needle has a connecting piece with a circular cross section with an armature head formed by cold forming in which the armature head is welded together with the armature. The valve needle permits a weight reduction and therefore a more rapidly closing valve. The valve needle is particularly suited for injection valves in fuel injection systems of mixture compressing internal combustion engines with externally supplied ignition.

11 Claims, 2 Drawing Sheets

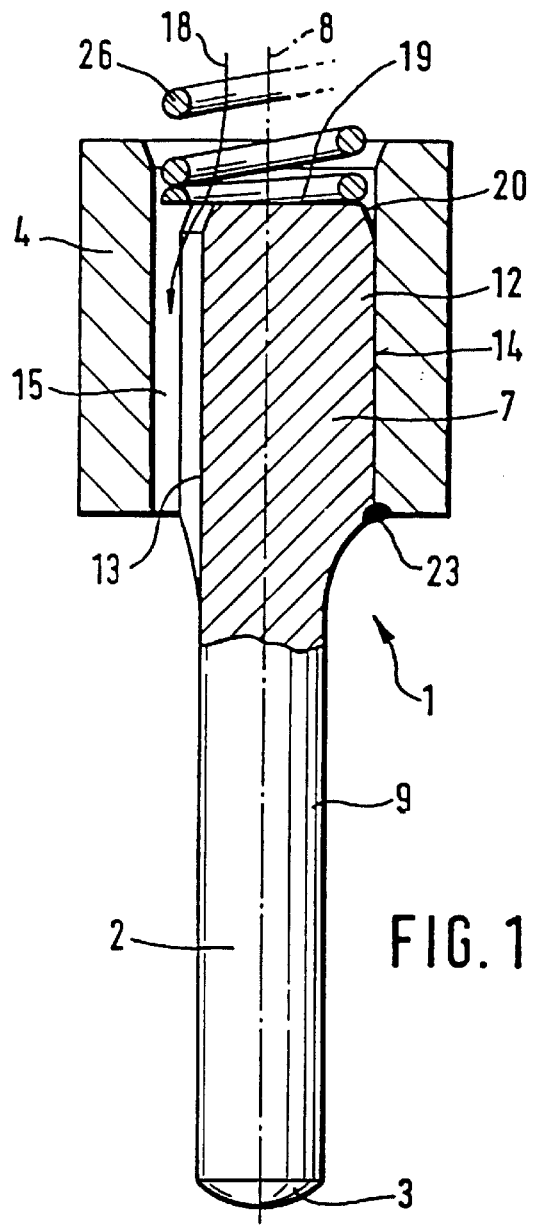
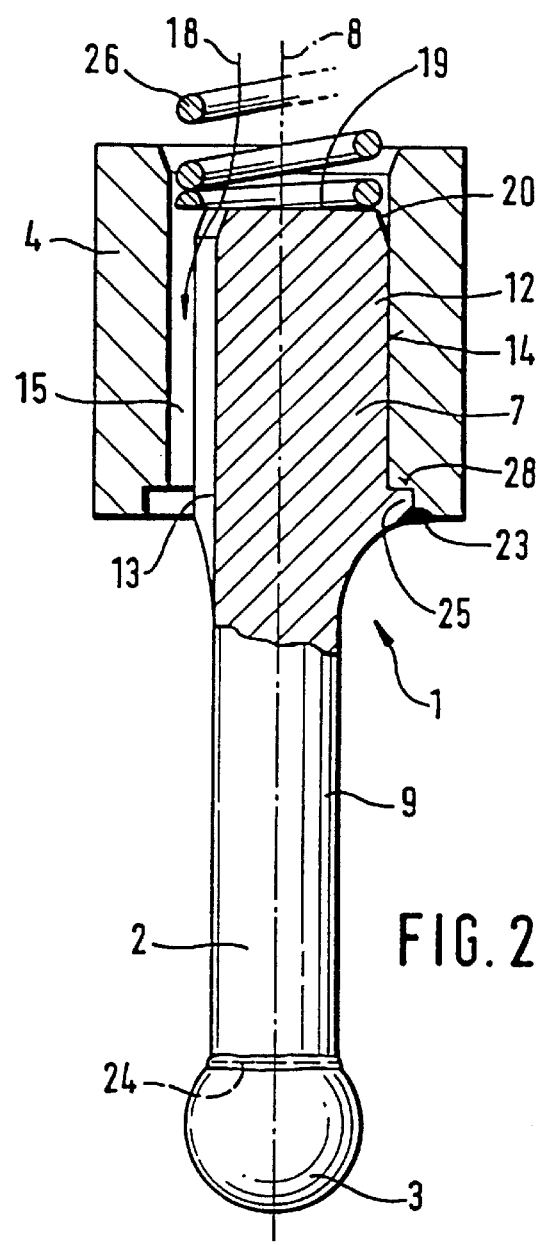
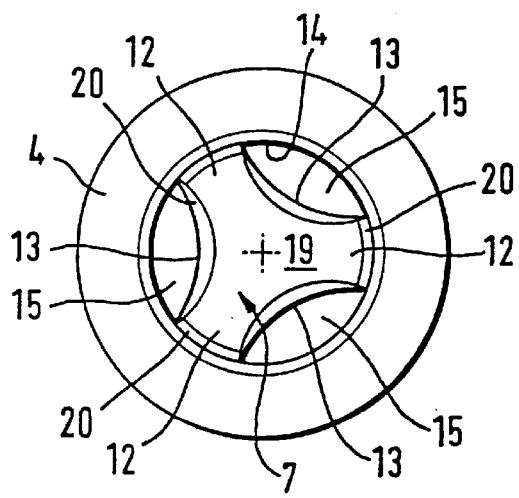
FIG. 1
FIG. 2
FIG. 4

VALVE NEEDLE AND PROCESS FOR PRODUCING A VALVE NEEDLE

This application Ser. No. 09/029,964 is the national stage 06 PCT/DE97/00364 filed Feb. 28, 1997.

PRIOR ART

The invention is based on a valve needle for an electromagnetically actuatable valve and a process for manufacturing a valve needle. DE 44 20 176 A1 now U.S. Pat. No. 5,820,031 has already disclosed a valve needle for an electromagnetically actuatable valve, which is comprised of an armature, a connecting piece, and a valve closing member connected to the armature by means of the connecting piece. The connecting piece is made of a semi-finished product that has a profiled cross section. In order to assure at least one sufficiently large flow conduit for the medium between the circumference of the connecting piece and the wall of a containing opening in the armature into which the connecting piece protrudes, the connecting piece has a relatively large expanse perpendicular to its longitudinal axis, which results in a relatively high mass for the valve needle, which leads to a delay of the valve actuation produced by an electromagnet.

ADVANTAGES OF THE INVENTION

The valve needle according to the invention, and the process for manufacturing a valve needle have the advantage of a simply embodied valve needle which has a low mass and can therefore be actuated more rapidly by the electromagnet. The connecting piece, which is formed out of a rod-shaped semi-finished product or wire with a circular cross section, permits sufficiently large flow conduits between the armature head and the armature in spite of the small diameter because of the embodiment according to the invention.

Advantageous embodiments and improvements of the valve needle are possible by means set forth herein.

The cross sectional shapes of the armature head can be easily manufactured and result in sufficiently large flow conduits through the armature.

The embodiment of a collar on the armature head brings the advantage that when the collar contacts the armature, there is an association that can be precisely predetermined between the armature and the connecting piece.

BRIEF DESCRIPTION OF THE DRAWINGS

Exemplary embodiments of the invention are shown in a simplified form in the drawings and explained in detail in the description that follows.

FIGS. 1 to 3 each shown an exemplary embodiment of a valve needle embodied according to the invention, in a partially sectional representation, and FIGS. 4 to 10 each shown a top view of a valve needle embodied according to the invention, with an armature.

DESCRIPTION OF THE EXEMPLARY EMBODIMENTS

Figure 3:
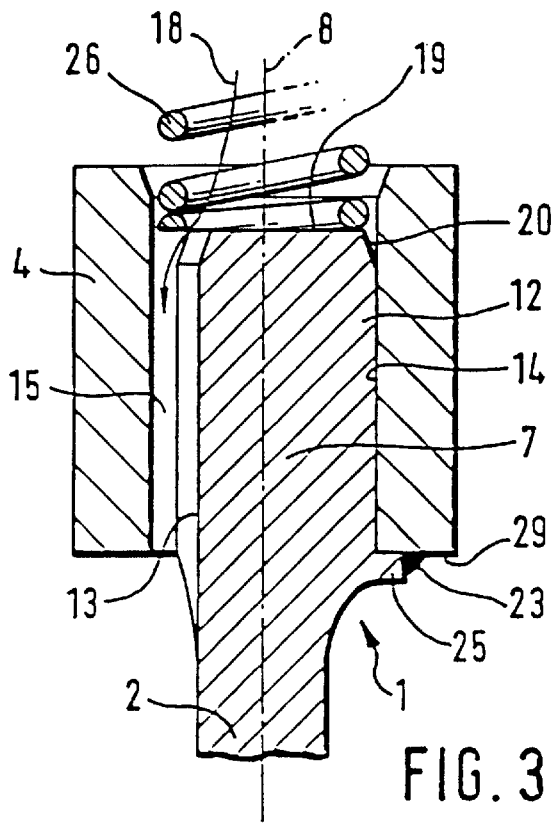

FIG. 1 shows a first exemplary embodiment of a valve needle 1 embodied according to the invention, which is for an electromagnetically actuatable valve, in particular for an injection valve for fuel injection systems of internal combustion engines. The valve needles described in FIG. 1 and in the Figs. that follow are used, for example, in an injection valve for fuel injection systems as shown and described in DE 44 20 176 A1. The valve needle 1 is comprised of a connecting piece 2, a valve closing member 3, and an armature 4 made of magnetically conducting material. The valve closing member 3 in the current exemplary embodiment is of one piece with the connecting piece 2 and is embodied as a section of a ball on the lower end of the connecting piece 2. The connecting piece 2 is made of a rod-shaped semi-finished product or a wire that has a circular cross section and a diameter of approximately 1.8 mm to 2.5 mm, and in fact, is made of stainless steel. The connecting pieces 2 are separated from the rod-shaped semi-finished product or wire so they have a predetermined length, e.g. they are sawed or cut out. An armature head 7 is embodied on the upper end of the connecting piece 2 remote from the valve closing member 3 and has a nonround cross section perpendicular to a longitudinal axis 8 through the connecting piece 2, with a greater expanse perpendicular to the longitudinal axis 8 than the section 9 of the connecting piece 2 between the armature head 7 and the valve closing member 3, which has a circular cross section. The armature head 7 is manufactured through the cold forming of the upper end of the connecting piece 2. The upper end of the connecting piece 2 is inserted into a swage and is axially swaged and pressed by means of pressure into the shape predetermined by the swage, without the supply of heat, in order to form the armature head 7, which has a greater expanse perpendicular to the longitudinal axis 8 after the cold forming than in the section 9 provided with a circular cross section. In the cold forming, for example, the armature head 7 is brought into a shape in which it has a Y-shaped cross section, as shown in FIG. 4. With a Y-shaped cross section, the armature head 7 according to FIG. 1 and FIG. 4 has three bridge parts 12 perpendicular to the longitudinal axis 8, which extend offset from one another by approximately 120° and between one another, respectively define a recess 13, which is embodied as arc-shaped, on the armature head 7. The armature head 7 protrudes into a containing opening 14 of the armature 4 in such a way that with their arc-shaped circumference, the bridge parts 12 touch the wall of the containing opening 14 and between each recess 13 and the wall of the containing opening 14, a flow conduit 15 is formed, which passes through the armature 4 in the direction of the longitudinal axis 8, via which a medium can flow in the direction of the arrow 18. Starting from an end face 19 of the armature head 7, bevels 20 are provided on the bridge parts 12 and recesses 13 and these bevels 20 extend obliquely toward the outside and achieve an easier insertion of the armature head 7 into the containing opening 14 and an easier influx of the medium into the flow conduits 15. The connecting piece 2, which is hardened as a whole after the cold forming of the armature head 7, is connected to the armature by means of a weld 23, for example by means of a laser, on the bridge parts 12, on their end oriented toward the valve closing member 3. The armature head 7 protrudes into the containing opening 14 of the armature 4 only to the point that the end face 19 of the armature head 7 is disposed inside the containing opening 14. As a result, a restoring spring 26 of the injection valve, which protrudes into the containing opening 14 and is supported against the end face 19, is guided inside the armature 4 on its end oriented toward the valve needle 1.

In the Figs. below, the same reference numerals are used for the same or similarly functioning parts. The second exemplary embodiment of a valve needle 1 embodied according to the invention represented in FIG. 2 differs from the first exemplary embodiment according to FIG. 1 on the one hand by virtue of the fact that the valve closing member 3 is embodied as an independent part in the form of a flattened ball and with this flattened part, rests against a flat end face 24 of the connecting piece 2 remote from the armature head 7 and is welded to it, and on the other hand by virtue of the fact that a collar 25 is embodied on the armature head 7 oriented toward the valve closing member 3 and when the armature head 7 is slid into the armature 4, this collar 25 rests in a contact groove 28 of the armature 4 and is welded to the armature. The connecting piece 2 is comprised, for example, of austenitic or ferritic chromium steel.

In the third exemplary embodiment of a valve needle 1 according to the invention that is represented in FIG. 3, the collar 25 of the armature head 7 rests against a lower end face 29 of the armature 4 and is welded to it.

FIGS. 5 to 10 represent other different cross sectional shapes of the armature head 7. In the embodiment according to FIG. 5, the armature head 7 has a cruciform cross section perpendicular to the longitudinal axis 8, with four bridge parts 12 and, together with the containing opening 14 of the armature 4, constitutes four flow conduits 15.

Figure 6:
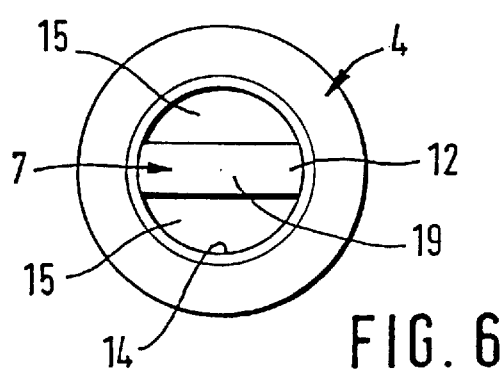

In the exemplary embodiment according to FIG. 6, the armature head 7 has a plate-shaped cross section perpendicular to the longitudinal axis 8 with two flat faces that extend parallel to each other and two end faces that are round in the direction of the containing opening 14 and defines two flow conduits 15.

Figure 7:
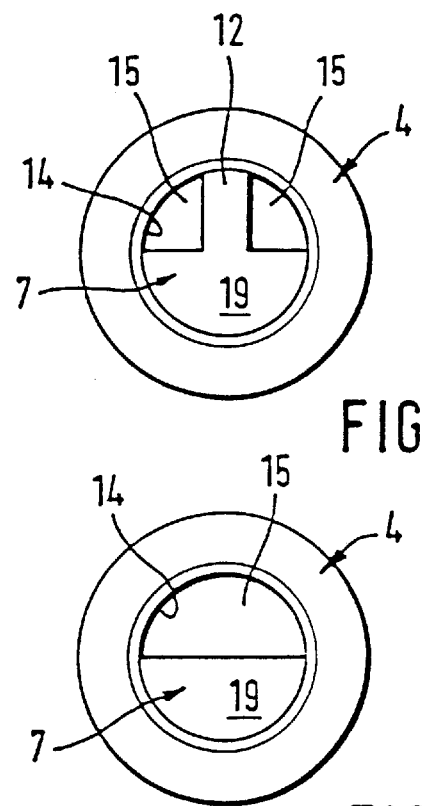
Figure 8:
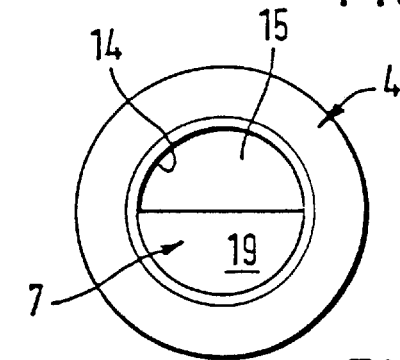
Figure 5:
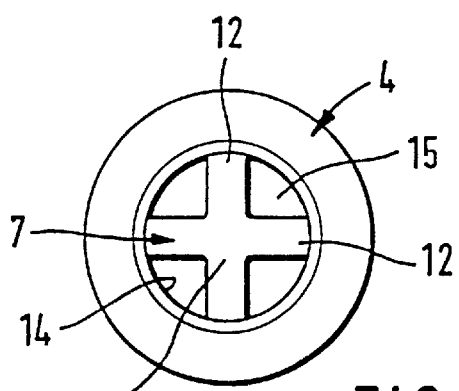

FIG. 7 represents the cross section of an armature head 7 perpendicular to the longitudinal axis 8, in which a bridge part 12 protrudes centrally from a semicircular cross section and forms two flow conduits 15. In FIG. 8, the armature head 7 has only a semicircular cross section perpendicular to the longitudinal axis 8 and defines only one flow conduit 15 with the armature 4.

Figure 9:
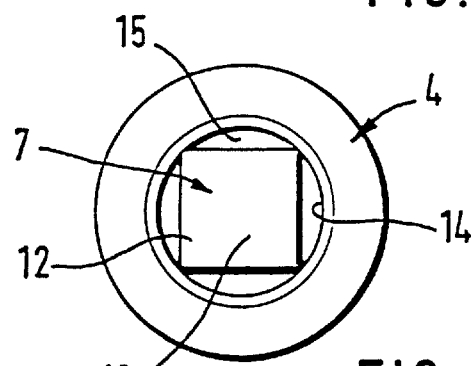
Figure 10:
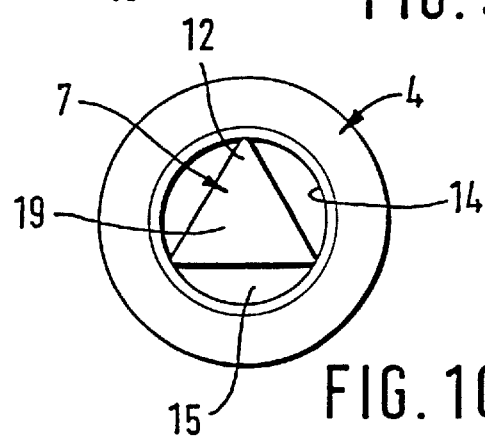

In FIGS. 9 and 10, the armature head 7 has triangular or square cross section perpendicular to the longitudinal axis 8 and, together with the armature 4, defines three or four flow conduits 15. In a manner not shown, the armature head 7 can also be embodied as pentagonal or polygonal perpendicular to the longitudinal axis 8.

The foregoing relates to preferred exemplary embodiments of the invention, it being understood that other variants and embodiments thereof are possible within the spirit and scope of the invention, the latter being defined by the appended claims.

I claim:

1. A valve needle for an electromagnetically actuatable valve, for an injection valve for fuel injection systems of internal combustion engines, comprising a valve closing member and a connecting piece that extends along a longitudinal axis, whose end remote from the valve closing member constitutes a solid armature head (7) which protrudes into a containing opening (14) of an armature sleeve (4) and is connected to said armature sleeve, wherein between the armature head and a wall of the containing opening of the armature sleeve, at least one flow conduit is formed along substantially an entire length of said armature sleeve which extends in a direction of the longitudinal axis, in which the connecting piece (2) is embodied as rod-shaped, with a circular cross section, and the armature head (7) is manufactured by means of cold forming with a greater expanse in a direction perpendicular to the longitudinal axis (8) than the circular cross section of the connecting piece (2) and with a non-round cross section.

2. The valve needle according to claim 1, in which the armature head (7) has a cruciform cross section.

3. The valve needle according to claim 1, in which the armature head (7) has a Y-shaped cross section.

4. The valve needle according to claim 1, in which the armature head (7) has an arc-shaped cross section.

5. The valve needle according to claim 1, in which the armature head (7) has a plate-shaped cross section.

6. The valve needle according to claim 1, in which the armature head (7) has a triangular or polygonal cross section.

7. The valve needle according to claim 1, in which a collar (25) is provided on the armature head (7), oriented toward the valve closing member (3) and said collar (25) has a greater expanse perpendicular to the longitudinal axis (8) than the containing opening (14) and rests against the armature sleeve (4).

8. The valve needle according to claim 1 in which the armature sleeve (4) and the armature head (7) are connected to each other by means of welding (23).

9. The valve needle according to claim 1, in which the valve closing member (3) is joined to the connecting piece (2) by means of welding.

10. The valve needle according to claim 7, in which the armature (4) and the armature head (7) are connected to each other by means of welding (23).

11. A process for manufacturing a valve needle for an electromganetically actuatable valve for an injection valve for fuel injection systems of internal combustion engines, said valve having a valve closing member and a connecting piece that extends along a longitudinal axis, whose end remote from the valve closing member constitutes an armature head, which protrudes into a containing opening of an armature sleeve and is connected to the armature sleeve, wherein between the armature sleeve head and the wall of the containing opening of the armature, at least one flow conduit is formed, which extends in the direction of the longitudinal axis, wherein said process comprises separating a connecting piece (2) from a rod-shaped semi-finished product with a circular cross section, forming an armature head (7) on the connecting piece (2) with a greater expanse in a direction perpendicular to the longitudinal axis (8) than the circular cross section of the connecting piece (2) by means of fold forming, sliding the armature sleeve (4) onto the armature head (7) and welding the armature (4) to the armature sleeve head (7).

* * * * *